(No Model.)  5 Sheets—Sheet 1.

J. E. CLAYTON & S. F. MACKIE.
SETTLER.

No. 344,519.  Patented June 29, 1886.

Witnesses,
Geo. H. Strong.
G. T. Fouke.

Inventors,
Joshua E. Clayton
Simon F. Mackie
By Dewey & Co.
Attorneys (No Model.) 5 Sheets—Sheet 2.

J. E. CLAYTON & S. F. MACKIE.
SETTLER.

No. 344,519. Patented June 29, 1886.

(No Model.) 5 Sheets—Sheet 3.
J. E. CLAYTON & S. F. MACKIE.
SETTLER.
No. 344,519. Patented June 29, 1886.
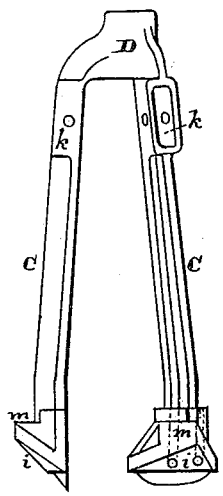
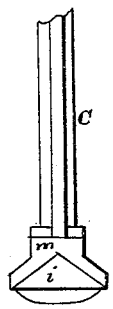
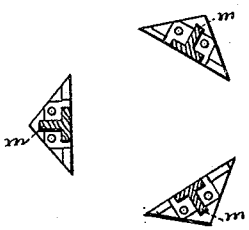
FIG. 4.     FIG. 6.     FIG. 5.
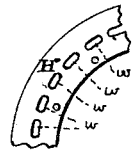   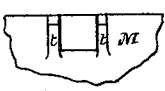 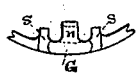
FIG. 7.   FIG. 8.   FIG. 9.   FIG. 10.   FIG. 11.
 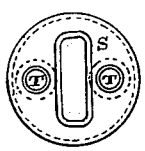  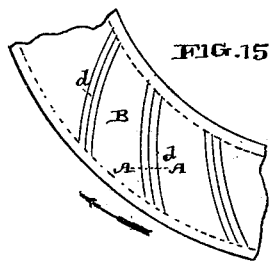
FIG. 12.   FIG. 13.   FIG. 14.   FIG. 15.
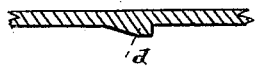
FIG. 16.
Witnesses,
Geo. H. Strong.
J. A. Strond.
Inventors,
Joshua E. Clayton
Simon F. Mackie
By Dewey & Co.
Attorneys (No Model.) 5 Sheets—Sheet 4.

J. E. CLAYTON & S. F. MACKIE.
SETTLER.

No. 344,519. Patented June 29, 1886.

Witnesses,
Geo. H. Strong.
J. A. Trouse

Inventors,
J. E. Clayton
S. F. Mackie
By Dewey & Co.
Attys (No Model.) 5 Sheets—Sheet 5.

J. E. CLAYTON & S. F. MACKIE.
SETTLER.

No. 344,519. Patented June 29, 1886.

Witnesses
T. W. Fowler
H. B. Applewhaite

Inventors
J. E. Clayton
S. F. Mackie
By their Attorneys
A. H. Evans & Co.

N. PETERS, Photo-Lithographer, Washington, D. C.

UNITED STATES PATENT OFFICE.

JOSHUA E. CLAYTON AND SIMON F. MACKIE, OF SALT LAKE CITY, UTAH TERRITORY.

SETTLER.

SPECIFICATION forming part of Letters Patent No. 344,519, dated June 29, 1886.

Application filed October 1, 1885. Serial No. 178,770. (No model.)

*To all whom it may concern:*

Be it known that we, JOSHUA E. CLAYTON and SIMON F. MACKIE, both of Salt Lake City, county of Salt Lake, and Territory of Utah, have invented an Improvement in Settlers; and we hereby declare the following to be a full, clear, and exact description thereof.

Our invention relates to that class of machinery used in silver-mills for treating ores, and known as "settlers;" and our invention consists in certain new and useful improvements in the construction of the settler, which we shall hereinafter claim, and fully describe by reference to the accompanying drawings, in which—

Figure 1:
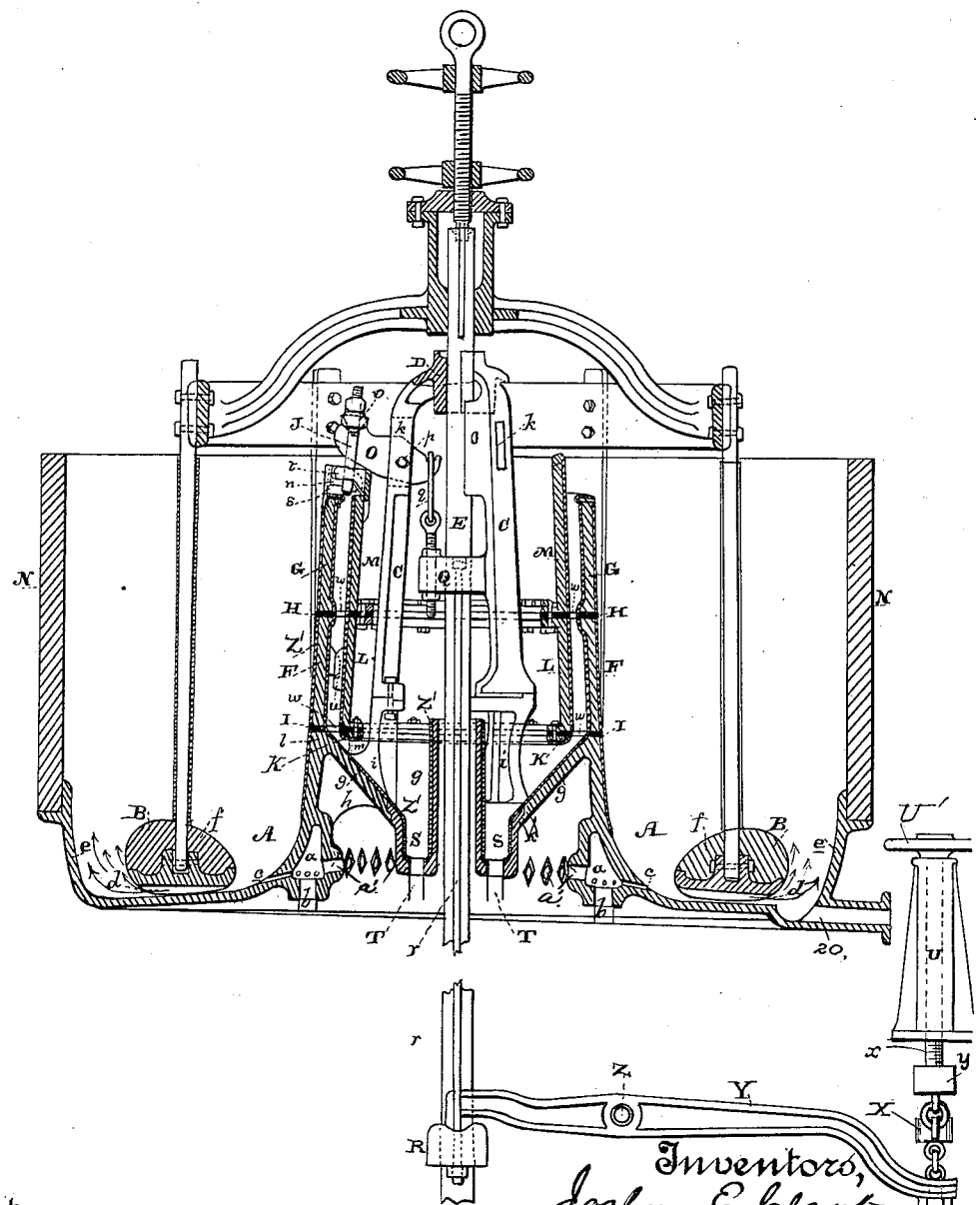
Figure 2:
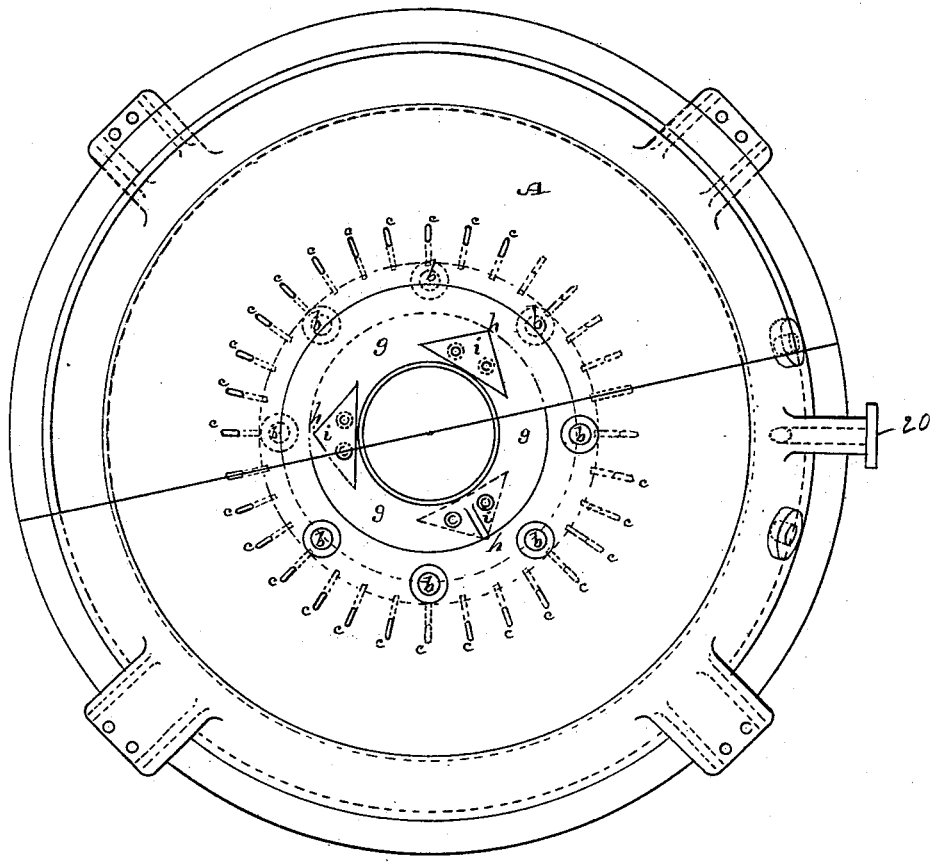
Figure 3:
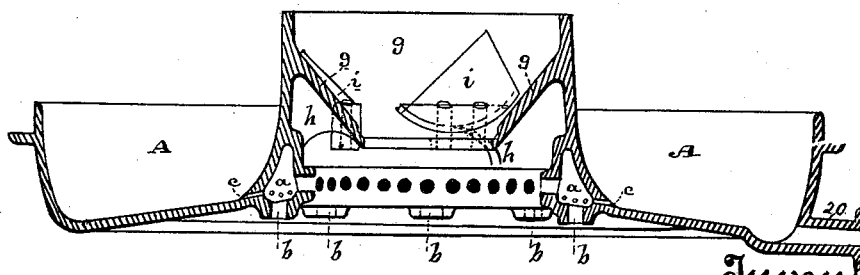
Figure 17:
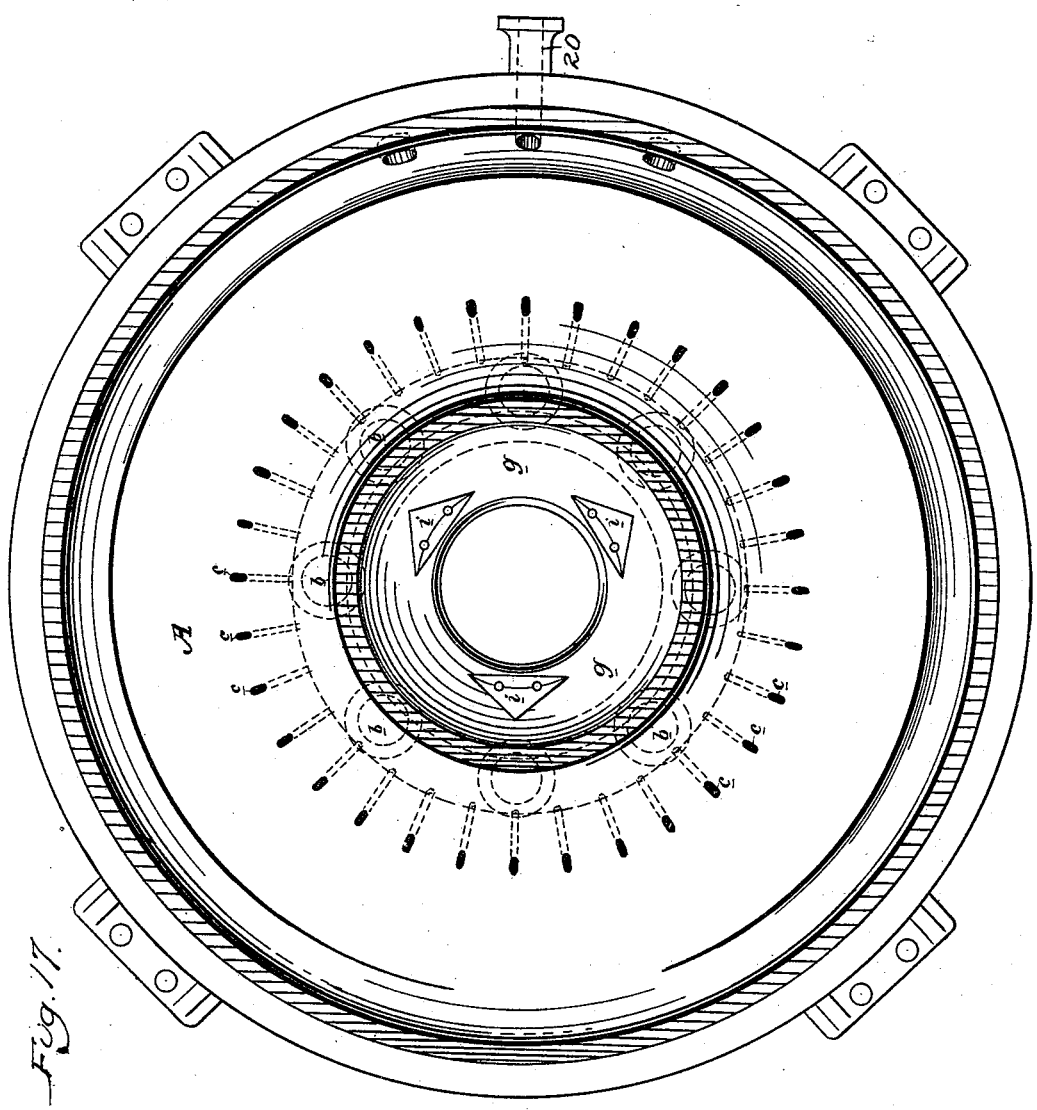
Figure 18:
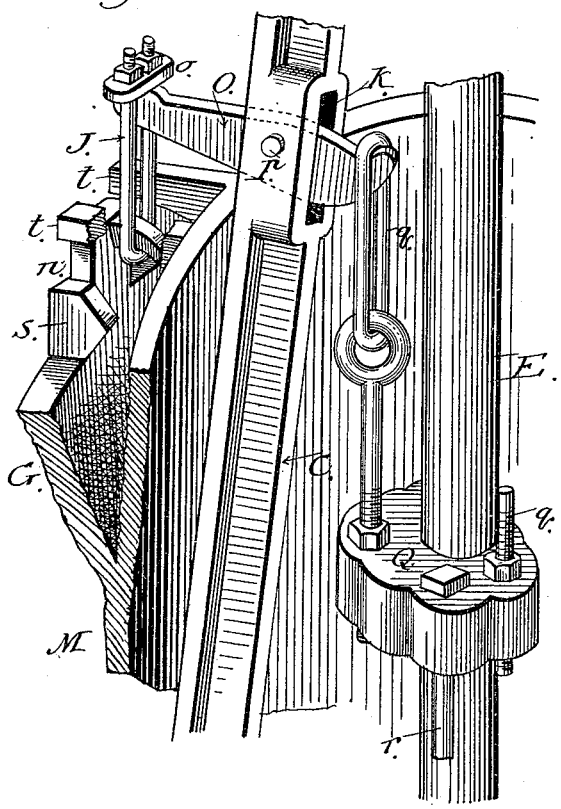
Figure 19:
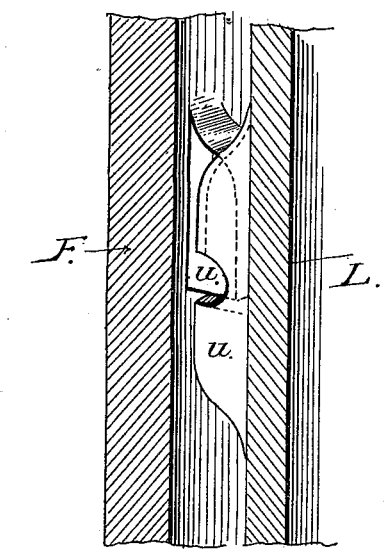
Figure 20:
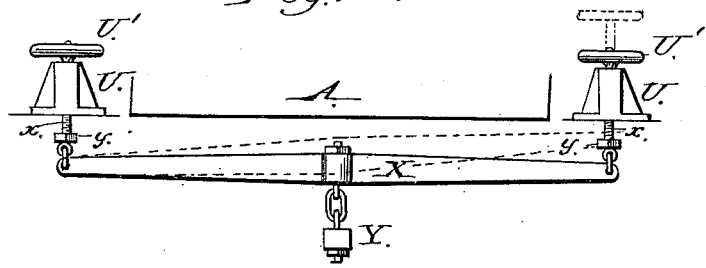

Figure 1 is a vertical section of our settler. Fig. 2 is a half-plan of the settler-bottom, looking down, and a half-plan, looking up. Fig. 3 is a section of the settler-bottom. Figs. 4, 5, and 6 are respectively an elevation of the front of the tripod-leg, a sectional plan of the tripod, and an elevation of the same. Fig. 7 is a plan of a portion of packing-ring. Fig. 8 is a plan of upper lifting-ring. Fig. 9 is a plan of the lifting-lugs for inner cone. Fig. 10 is an elevation of the lifting-lugs for inner cone. Fig. 11 is a plan of the lifting-lugs for outer cone. Fig. 12 is an elevation of the lifting-lugs for outer cone. Fig. 13 is a plan of loose hopper. Fig. 14 is a plan of lower lifting-ring. Fig. 15 is a plan of part of under side of muller. Fig. 16 is a section of the muller shoe. Fig. 17 is a sectional plan view of our settler. Fig. 18 is a detached view, on an enlarged scale, of the devices for raising the cones F and G. Fig. 19 is a detached sectional view of parts of the cones F and L, showing their engaging lugs. Fig. 20 is a detached view of the two hand-wheels and their standards for regulating the action of the cones F and G.

The bottom A consists of a simple casting, in the central part of which is a hollow ring, $a$, into which the washing and diluting water is led through some of the eight plug-holes, $b$. Those of these holes not used as water-inlets are closed by screw-plugs. The washing-water flows out from this hollow ring $a$ into the settler by thirty-two small radial holes, $c$. These holes open close to the bottom of the settler and into the indraft of the muller, and discharge the washing-water into the settler in small jets directed radially outward.

The muller-ribs $d$ are curved and have the same general form as the blades of a centrifugal pump, and act as such when the muller B is in rotation. The pulp being drawn in under the muller and forced outward, the washing-water issuing from the small holes $c$ flows directly into the indraft or suction of the muller B, and after diluting the pulp is, by the action of the ribs $d$ and its own momentum, driven under the muller and outward as diluted pulp. After passing under the muller B the current of diluted pulp is deflected upward by the curved sides $e$ of the settler-bottom and then turns downward and flows toward the inside of the muller. There is thus produced a series of spiral currents flowing around and around the muller, with dead or comparatively dead water at the central upper portion of the settler.

The upper part, $f$, of the muller is rounded off, so as to have the shape of the induced current of liquid in the settler.

By referring again to the settler-bottom, it will be seen that the upper central portion is furnished with an annular curtain or hopper, $g$, stiffened and supported by three ribs, $h$, resting on the ring $a$. On this hopper are three equidistant seats, $i$, on which rest the legs of the tripod C, which carries the upper bearing, D, of the muller-spindle E. The tripod-legs are provided with suitable feet, and in the upper part of each leg is cast an opening or recess, $k$.

Upon the seating $l$, formed on the upper portion of the bottom A, rest two cones or conical rings, F and G, one above the other, there being between the bottom A and cone F and between the cones F and G rubber packings H and I.

The discharge of the tailings from the dead or comparatively dead space, previously mentioned, at different levels, is accomplished as follows: The discharge at the highest level is by the tailings flowing over the top of the cone G, and at other levels by first raising the cone G and allowing the tailings to flow over the cone F, and then by raising the cone F and allowing them to flow over the bottom A.

The raising of the cones G and F is effected by the following mechanism: Inside the rings F and G and resting upon steps or supports $m$, cast on the tripod seats or feet, are three inner cones or rings, K, L, and M, which are bolted together, and between which are secured the packings or seatings H and I. The inner cone M rises as high as the staves N, which rest upon the bottom A, and a little higher than the top of the cone G. Between the cones G and F and the cones M, L, and K there is an annular space through which the tailings discharge. The upper portion of the cone G has cast on it at three equidistant points the lugs $n$. (See Figs. 1, 11, and 18.) These are engaged by three U-bolts, J, which pass through and are secured to the knife-edges $o$ upon three levers, O, passing through the openings or recesses $k$ in the tripod-legs C. These levers have for their fulcrums the bolts $p$, which pass through the tripod-legs C and levers O. The inner ends of the three levers O engage with ring-bolts $q$, whose lower ends pass through the upper lifting-ring, Q, and are secured by nuts on the under side. There also pass through this upper lifting-ring long bolts $r$, which go through the lower lifting-ring, R, and are secured on its under side. Any depression of the lower lifting-ring, R, therefore depresses the upper lifting-ring, Q, the ring-bolts $q$, and the inner ends of the levers O, and these levers, turning about their fulcrums $p$, raise the knife-edges $o$, U-bolts J, and cone G. The raising of the lower outer cone, F, is accomplished as follows: On the upper part of the cone G are cast at three equidistant points lugs $s$, which, when this cone has been raised high enough, engage with the lugs $t$, cast on the upper inner cone, M, and if the cone G is raised above the point where the lugs $s$ and $t$ engage, the inner cones, M, L, and K, which are all fastened together, are carried up. At three equidistant points on the inner cone L are cast the lugs $u$, which engage with similarly-placed lugs cast upon the outer cone F, and upon raising the cone G above a certain height the cone F is also lifted; hence it will appear that if both cones are down on their seatings a depression of the lifting-ring R raises the cone G, leaving an opening between the cones G and F, through which the tailings will pass, and that a further depression of the lower lifting-ring, R, without closing the opening between the cones G and F, raises the cone F, leaving another and lower opening between it and the bottom A, through which the tailings will pass. These three discharges correspond to the three plug-holes in an ordinary settler.

To allow the passage of the tailings through the annular space between the outer cones, F and G, and inner cones, K, L, and M, which is traversed by the rubber packings H and I, these packings are perforated with a number of holes, $w$. To discharge the tailings clear of the running-gear of the settler, a loose hopper, S, is fitted water-tight in the opening of the curtain or hopper $g$, cast on the bottom A. This hopper has a sleeve or pipe in the center, and through this sleeve the spindle E and bolts $r$ pass. The hopper S discharges the tailings into the pipes T. The muller-spindle E passes through the lifting-rings Q and R, and serves as a guide for them.

To as far as possible prevent the raising of both cones F and G at one time by careless handling, hand-wheels U', with suitable standards, U, are placed in front of the settler at equal distances from the median line. The spindles $x$ from these hand-wheels are threaded at their lower ends and screw into the standards U, and are also swiveled or otherwise attached to the nuts $y$, and these nuts $y$ are attached by any suitable connections to the ends of the yoke X, which is coupled at the center by links to the outer end of the lever Y, which turns upon the pintle Z, and whose inner end rests upon the lower lifting-ring, R.

Assuming both cones F and G to be home on their seats, it is apparent that the mechanism just described can be so arranged that by screwing up one of either of the hand-wheels the cone G only will be lifted, and that to raise both of the cones F and G both hand-wheels must be used.

The arrangement of muller-drivers, &c., is substantially as usual.

In operating this settler the pulp is charged as usual; but the action of the radial jets of washing water issuing from the holes $c$ and the rotation of the muller, causes the rotation of the pulp around the muller in spiral lines, the lighter portions traveling through the longer curves. The stillest water and thinnest pulp are at the upper central portion of the mass, and this flows over the top of the cone G. When the dilution of the pulp and washing off of the lightest portion have proceeded far enough, the cone G is raised, and heavier portions of the pulp washed off, and then the cone F is raised, and still heavier portions washed off.

It will be evident that the uniform distribution of the washing-water in small radial jets tends to produce uniform upward currents around the periphery of the settler, and that the induced currents from all causes are uniform and similar in every section of the settler. This, when coupled with the discharge in a thin sheet from the central part of the settler, renders the character of the tailings at any particular period of the work uniform, and thus facilitates the saving of the amalgam and grading of the tailings into different classes. To obtain the best results the pressure of the wash-water should be low at starting, and gradually increased as the lighter portions of the tailings are washed away.

The surfaces of the cones, the curtain $g$, and the hopper S with which the material treated comes in contact, are covered with a thin layer of Portland cement (indicated by Z') and applied with a trowel over the paint when dry. This is for the purpose of preventing corrosion.

The material which collects in the bottom of the settler is drawn off through the outlet 20, (shown in Figs. 1, 2, 3, and 17 of the drawings,) and the inner wall of the ring $a$ may be provided with a series of apertures, $a'$, through which a suitable drill or tool may be introduced to drill the channels $c$, the openings being plugged up after the channels have been drilled.

Having thus described our invention, what we claim as new, and desire to secure by Letters Patent, is—

1. In a settler, the bottom A and the staves N, in combination with concentric rings having spaces between them, through which the tailings pass out centrally, substantially as described.

2. In a settler, the muller B, having its upper surface curved inwardly and a shoe secured to its under surface, the said shoe having curved ribs $d$ on its under surface, substantially as and for the purpose herein described.

3. The combination of the staves N, the bottom A, having the ring $a$, feed or inlet pipes $b$, and discharge-holes $c$ in the ring, with the revolving muller B, having curved ribs $d$ on the under side of the shoe, substantially as described.

4. The combination, with the bottom A and the staves N, of the vertically-adjustable cone F, seated upon the bottom, and the cone G, seated upon the cone F and in alignment therewith, whereby the tailings pass between said cones, substantially as herein described.

5. The combination of the bottom A and the staves N with the vertically-adjustable cones F and G in alignment vertically, and the intervening packings H and I, substantially as herein described.

6. In a settler, the combination of the bottom A, the staves N, and the vertically-adjustable cones F G with the inner cones, L M, spaced from the outer ones, whereby a discharge-passage is formed between them, substantially as described.

7. The combination of the bottom A, the staves N, and the outer cones, F and G, with the inner cones, L M, lugs $s$ and $t$, levers O, lugs $n$, U-shaped bolts J, knife-edges $o$, ring-bolts $q$, bolts $r$, and rings Q and R, substantially as described.

8. The combination of the bottom A, staves N, the outer cones, F and G, the inner cones, L M, lugs $s$, $t$, and $u$, levers O, lugs $n$, U-shaped bolts J, knife-edges $o$, ring-bolts $q$, bolts $r$, and rings Q and R with the hand-wheels U', screw-spindles $x$, yoke X, and lever Y, substantially as described.

9. The combination of the bottom A, staves N, the outer cones, F and G, the inner cones, L M, lugs $s$ and $t$, levers O, lugs $n$, U-shaped bolts J, knife-edges $o$, ring-bolts $q$, bolts $r$, and rings Q and R with the perforated packings H and I, substantially as herein described.

10. The combination of the staves N, the tripod C, having recesses or openings $k$, bearing D, and bottom A with the outer cones, G and F, inner cones, L and M, lugs $n$, $s$, $u$, and $t$, U-shaped bolts J, bolts $r$, levers O, knife-edges $o$, ring-bolts $q$, and rings Q and R, substantially as described.

11. The combination of the staves N, the bottom A, the ring $a$, feed or inlet pipes $b$, and discharge-holes $c$ with the revolving muller B, power-shaft E, cones F G L M, forming a discharge-passage, and the hopper S, and discharge-pipes T, substantially as herein described.

12. In a settler, the staves N, the bottom A, having an annular curtain or hopper, $g$, in its central portion, and the tripod C, resting on said curtain and carrying the bearing for the driving-spindle, in combination with the cone F, resting on the curtain, and the cone G on cone F, and the inner cones, L M, and hopper S, substantially as herein described.

In witness whereof we have hereunto set our hands.

JOSHUA E. CLAYTON.
SIMON F. MACKIE.

Witnesses:
THOMAS C. BAILEY,
W. R. MESICK, Jr.